United States Patent [19]

Madison

[11] Patent Number: 5,619,931
[45] Date of Patent: Apr. 15, 1997

[54] ROAD AND RAIL USING RAIL WHEEL DRIVE AND APPARATUS

[75] Inventor: Harry Madison, Memphis, Tenn.

[73] Assignee: Harsco Corporation, Wormleysburg, Pa.

[21] Appl. No.: 505,025

[22] Filed: Jul. 21, 1995

[51] Int. Cl.[6] .................................................. B61C 11/00
[52] U.S. Cl. ............................................................ 105/72.2
[58] Field of Search .............................. 105/72.2, 215.2, 105/215.1

[56] References Cited

U.S. PATENT DOCUMENTS

| | | | |
|---|---|---|---|
| 1,827,898 | 10/1931 | Moore | 105/72.2 |
| 2,157,651 | 5/1939 | Fildes | 105/215.2 |
| 2,896,553 | 7/1959 | Whisler | 105/72.2 |
| 3,019,742 | 2/1962 | Kershaw | 105/72.2 |
| 3,877,390 | 4/1975 | Wallace | 105/72.2 |
| 4,497,257 | 2/1985 | White | 105/215.2 |
| 4,537,137 | 8/1985 | White | 105/215.2 |
| 5,016,544 | 5/1991 | Woollam | 105/215.2 |
| 5,103,740 | 4/1992 | Masse | 105/72.2 |
| 5,186,109 | 2/1993 | Madison | 105/215.2 |

*Primary Examiner*—Mark T. Le

[57] ABSTRACT

A road and rail vehicle has a truck tractor vehicle frame such that it is street legal, but also provides sufficient power to move freight cars on low density rail lines or at other desired locations. The vehicle has a transfer case to provide front wheel drive by road wheels when the vehicle is in a road or highway mode and to provide rear wheel drive by rail wheels when in a rail mode. The vehicle has a front guide rail wheel unit which moves front rail wheels between an upper road position and a lower rail position. A rear or back axle has right and left back road wheels thereon and is movable between an upper rail position and a lower road position.

19 Claims, 3 Drawing Sheets

ROAD AND RAIL USING RAIL WHEEL DRIVE AND APPARATUS

BACKGROUND OF THE INVENTION

The present invention relates to a rail engagement apparatus having powered rail engagement wheels for a road vehicle. Further, this invention relates to a vehicle having such an apparatus mounted to it.

As used herein, a road vehicle is a vehicle having wheels which contact a highway or other road, as opposed to only having wheels which roll on rails on a railroad track.

Railroad service crews often have to go to various places along a railroad track in order to make repairs and inspections. Depending upon the type of service which is performed and other factors, the service crew may ride to the work site using a rail vehicle or using a road vehicle, such as a truck or car. Since the best way to a work site may include travel along a road and travel along a railway, service crews and other rail workers often have used road vehicle having a rail engagement or guide wheel apparatus mounted on them. Such cars or trucks may travel along a highway or other road with road wheels engaging the road. Upon getting to an appropriate place along the railway, the rail engagement apparatus is operated such that railway wheels are lowered from the vehicle until the vehicle is bound to the railway. Usually such vehicles include an apparatus at the front of the vehicle which lifts the front road wheels off the ground when two front railway wheels engage rails and an apparatus at the back of the vehicle, which apparatus secures the back of the vehicle to the rails by two back railway wheels. The two back railway wheels allow the regular road wheels to contact the rails or other surface such that the road wheels may provide traction to move the vehicle even when the two front railway wheels and two back railway wheels have secured the vehicle to the rail. When the vehicle wishes to leave the railway, the two front railway wheels and the two rear railway wheels are retracted or lifted up such that the vehicle may again run along the road.

Various structures have been used to allow railway wheels to be attached to road vehicles. Although such structures have been generally useful at moving the railway wheels between an upper position in which the vehicle may travel along a highway or other road and a lower position in which the vehicle travels along a railway, such structures have often been subject to one or more of several disadvantages.

It has been desirable to have a road vehicle which can also move loads along a railroad track. Various vehicles having rubber tires for highways and rail guide wheels for rails have been used to move railway freight cars with varying degrees of success. Such road/rail vehicles may advantageously move along highways until they reach a railroad track where they can lower their rail engagement wheels and travel along the railroad track. They may then move loads such as rail bound vehicles secured to a rail/highway vehicle. Such rail/highway vehicles may work satisfactorily for some purposes, but the rubber road tires wear out and rapidly fail at higher loads. That is, such rail/highway vehicles are powered by the rubber road tires even though they are bound to the rails when their rail engagement wheels are down. When the loads on the rubber road tires are too high, the tires simply wear out rapidly.

Special vehicles for moving freight cars have been developed, but they are limited to very slow road speeds. These vehicles are basically small locomotives having rail engagement wheels which do not raise and lower. Instead, such small locomotives are modified to have rubber tires which raise and lower such that the vehicle can travel on road surfaces off of rails. However, the special tire mounting and drive arrangements for the rubber tires greatly restrict the road speed of such vehicles. Such vehicles travel on road surfaces by using frictional contact between driven rail engagement wheels and road wheels which have been lowered to a road position. In other words, such special vehicles can travel independent of the rails from one side of a rail yard to another side, but cannot be used on a regular road without going so slowly as to substantially impede the flow of other traffic. More importantly, such vehicles do not use road vehicle frames (meaning frames of cars, trucks, or other street legal vehicles). Instead, they use locomotive or other rail vehicle frames and are accordingly not street legal for normal transit on a highway or other road.

Regular locomotives have often been used for moving freight or other rail cars along light traffic density outlying rail lines. For example, if a given manufacturer is sending two freight cars a day to a rail yard on further travel, a locomotive could be used to move the two freight cars. (Alternately, the locomotive would pick up freight cars at the manufacturer only after a larger number of freight cars are ready, but this may slow the manufacturer's ability to ship in timely fashion.) If the locomotive is tied up moving a small number of freight cars, it cannot be used at other locations where its great power is needed. Further, moving the locomotive by rail to the rail line adjacent the manufacturer's plant requires that track occupancy and rail signaling be handled properly so that the locomotive is switched to the right path and does not collide with (or cause significant delays for) other trains using some of the same tracks.

The present inventor's prior U.S. Pat. Nos. 5,154,124, issued Oct. 13, 1992, and 5,186,109, issued Feb. 16, 1993, both assigned to the assignee of the present application, relate to different apparatus for moving a highway vehicle along a railroad track. Both of those patents are hereby incorporated by reference.

OBJECTS AND SUMMARY OF THE INVENTION

Accordingly, it is a primary object of the present invention to provide a new and improved apparatus for allowing a highway vehicle to move along a railroad track.

A further object of the present invention is to provide a new and improved vehicle which can move along highways and along railroad tracks.

A further object of the present invention is to provide an apparatus and a vehicle for rail/highway use which will work satisfactorily with heavy loads such as freight cars.

Yet another object of the present invention is to provide a vehicle, an apparatus, and a method for moving rail cars on light traffic density outlying rail lines.

A further object of the present invention is to provide a vehicle and apparatus for road/rail use which avoids damaging rubber tires when traveling on rails.

Yet another object of the present invention is to provide a vehicle and apparatus for road/rail use which can move relatively quickly on both roads and rails.

The above and other features of the present invention which will be more readily understood when the following detailed description is considered in conjunction with the accompanying drawings are realized by a road and rail vehicle including a vehicle frame, at least a first right front road wheel selectively supporting a portion of the vehicle frame, and at least a first left front road wheel selectively supporting a portion of the vehicle frame. First right front and first left front rail engagement wheels selectively support a portion of the vehicle frame. First right back and left back road wheels selectively support a portion of the vehicle frame. First right back and left back rail engagement wheels selectively support a portion of the vehicle frame. A mode controller is operable to select between:

a road mode in which the road wheels engage a road and the vehicle is driven by driving road wheels of the road wheels independent of the rail wheels; and a rail mode in which the rail engagement wheels engage rails of a railroad track, the vehicle is driven by driving rail engagement wheels of the rail engagement wheels, and all of the road wheels are offset from any surfaces therebelow.

The vehicle frame is the frame of a road vehicle. The driving rail engagement wheels include the right and left back rail engagement wheels. The driving rail engagement wheels further include the right and left middle rail engagement wheels. The right and left back rail engagement wheels are flanged wheels and the right and left middle rail engagement wheels are non-flanged wheels.

A rail wheel unit movably supports the right and left front rail engagement wheels for movement relative to the vehicle frame between an upper road position corresponding to the road mode and a lower rail position corresponding to a rail mode. A back road axle has the right and left back road wheels thereon and the back road axle is movably supported by the vehicle frame for movement between an upper rail position and a lower road position.

Right and left middle rail engagement wheels and right and left middle road wheels are on the vehicle. The right and left middle road wheels are movably supported by the vehicle frame for movement between an upper rail position and a lower road position. The driving rail engagement wheels further include the right and left middle rail engagement wheels and the driving road wheels include the right and left front road wheels An engine is supported by the vehicle frame. The mode controller includes a transfer case operable to selectively transfer power either:

from the engine to drive the driving road wheels when in the road mode; and from the engine to drive the driving rail engagement wheels when in the rail mode.

The present invention may alternately be described as a road and rail vehicle including a vehicle frame; first right and left front road wheels selectively supporting a portion of the vehicle frame; first right and left front rail engagement wheels selectively supporting a portion of the vehicle frame; first right and left back road wheels selectively supporting a portion of the vehicle frame; first right and left back rail engagement wheels selectively supporting a portion of the vehicle frame; and an engine supported by the vehicle frame. A mode controller is operable to select between:

a road mode in which the road wheels engage a road and the vehicle is driven by driving road wheels of the road wheels; and a rail mode in which the rail engagement wheels engage rails of a railroad track, the vehicle is driven by driving rail engagement wheels of the rail engagement wheels, and the road wheels are offset from any surfaces therebelow.

The mode controller includes a transfer case operable to selectively transfer power either:

from the engine to drive the driving road wheels when in the road mode; and from the engine to drive the driving rail engagement wheels when in the rail mode.

In the road mode, the vehicle is driven by driving road wheels of the road wheels independent of the rail wheels. The driving road wheels include the right and left front road wheels, the driving rail engagement wheels include the right and left back rail engagement wheels, the right and left back road wheels are non-powered, and the right and left front rail engagement wheels are non-powered.

A rail wheel unit movably supports the right and left front rail engagement wheels for movement relative to the vehicle frame between an upper road position corresponding to the road mode and a lower rail position corresponding to a rail mode. A back road axle has the right and left back road wheels thereon and the back road axle is movably supported by the vehicle frame for movement between an upper rail position and a lower road position.

The vehicle frame is a truck tractor frame and the vehicle further includes right and left middle rail engagement wheels and right and left middle road wheels, the right and left middle road wheels movably supported by the vehicle frame for movement between an upper rail position and a lower road position. The driving rail engagement wheels further include the right and left middle rail engagement wheels and wherein the driving road wheels include the right and left front road wheels.

The present invention may alternately be described as a road and rail vehicle including: a vehicle frame; first right and left front road wheels selectively supporting a portion of the vehicle frame; first right and left front rail engagement wheels selectively supporting a portion of the vehicle frame; first right and left back road wheels selectively supporting a portion of the vehicle frame; first right and left back rail engagement wheels selectively supporting a portion of the vehicle frame. A mode controller is operable to select between:

a road mode in which the road wheels engage a road and the vehicle is driven by at least one of the right and left front road wheels; and a rail mode in which the rail engagement wheels engage rails of a railroad track, the vehicle is driven by at least the right and left back rail engagement wheels, and the road wheels are offset from any surfaces therebelow.

In the rail mode, the vehicle is driven by right and left middle rail engagement wheels as well as the right and left back rail engagement wheels. The right and left front rail engagement wheels are non-powered and the right and left back road wheels are non-powered. The right and left front road wheels are driven independent of all of the rail wheels. (As used herein, they are independent in the sense that energy is not transferred to the road wheels, directly or indirectly, via the rail wheels.)

An engine is supported by the vehicle frame. The mode controller includes a transfer case operable to selectively transfer power either:

from the engine to drive the right and left front road wheels when in the road mode; and from the engine to drive the right and left back rail engagement wheels when in the rail mode.

A first transmission is used to transfer power from the engine to the transfer case and a second transmission is used to transfer power from the transfer case to the right and left back rail engagement wheels.

BRIEF DESCRIPTION OF THE DRAWINGS

The above and other features of the present invention will be more readily understood when the following detailed description is considered in conjunction with the accompanying drawings wherein like characters represent like parts throughout the several views and in which.

DETAILED DESCRIPTION

Figure 1:
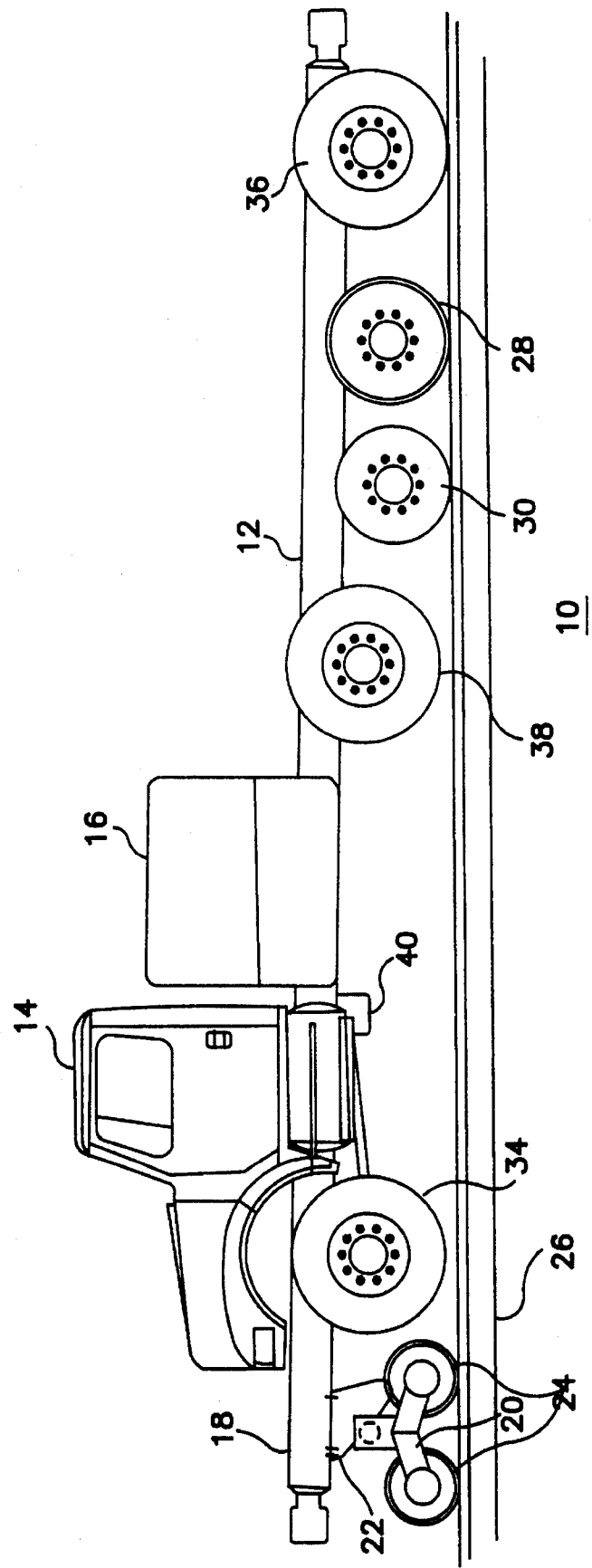
FIG. 1 is a side view of the present invention in a rail mode for traveling along railroad tracks.

Turning initially to FIG. 1, a preferred embodiment of the present invention is a road and rail vehicle 10 having a truck tractor vehicle frame 12 with a cab 14 thereon. A box 16 may house various air equipment used in known fashion for controlling vertically movable axles, air brakes, etc.

A frame extension 18 has been mounted at the front of vehicle 10 for holding a rail wheel guide unit 20 on mount plate 22. The various wheels and other components discussed herein are symmetric with respect to right and left sides of the vehicle such that the construction of the right side components will be understood from the illustrations and discussions of left side components herein.

The rail guide unit 20 has first and second front left rail engagement wheels 24 which are flanged steel wheels for non-powered engagement with left rail 26 (i.e., wheels 24 are not driven when the vehicle is in the illustrated rail mode with the rail wheels 24 in a lower, rail position. The frame extension 18 and rail guide unit 20 may be of a known types used for various previous road vehicles modified to run on rails. However, unlike various of the common road vehicles modified to run on rails which use road tires for propulsion even in the rail mode, the vehicle 20 is propelled in the rail mode by driving rail engagement wheels.

Driving rail engagement wheels (i.e., rail engagement wheels which are driven or powered to propel the vehicle) on the vehicle 10 include left back steel flanged rail engagement wheel 28 and left middle (i.e., middle meaning between the back rail wheel 28 and front rail wheels 24, not necessarily centered) steel non-flanged wheel 30. Each of the rail wheels 28 and 30 (including the pair on the non-illustrated right side of the vehicle) engages a rail for propelling the vehicle along when in the rail mode. The left middle rail wheel 30 and similar right wheel are non-flanged such that they do not cause problems when the vehicle 10 goes around a curve. Although the middle rail wheel 30 is illustrated somewhat offset in the rail direction from back rail wheel 28, the middle wheel 30 might alternately be just in front of wheel 28.

Figure 2:
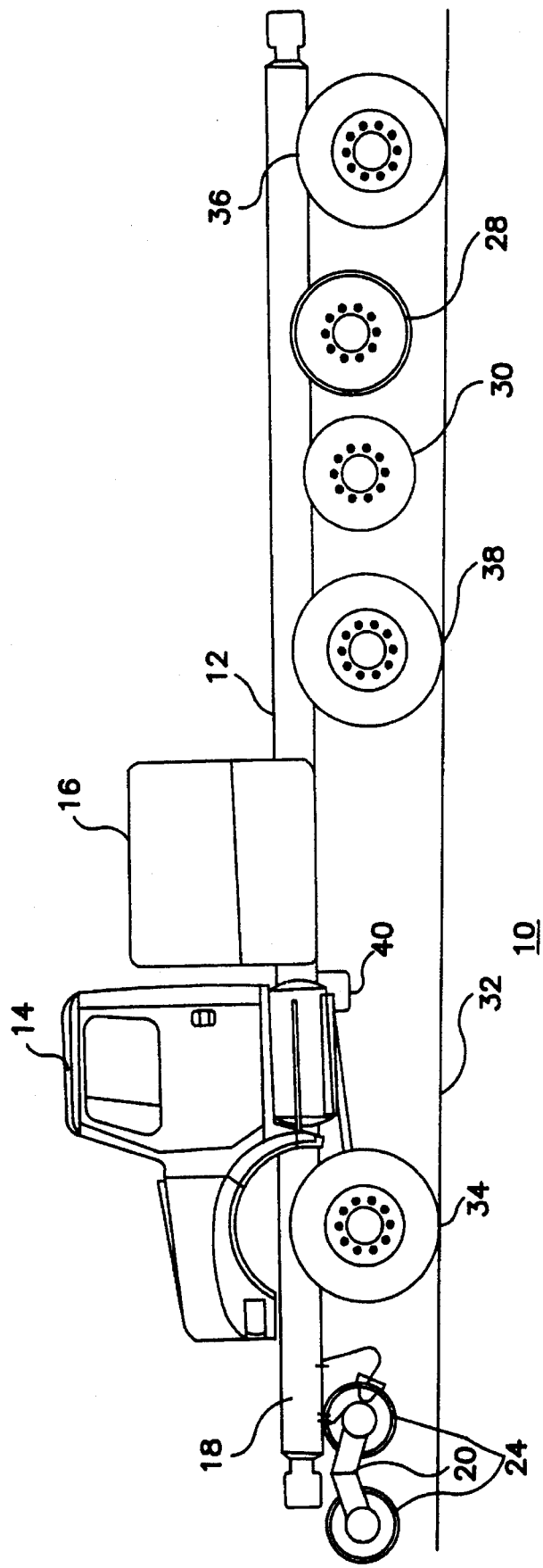
FIG. 2 is a side view of the present invention in a road mode (could also be called highway mode) for traveling along a road.

Continuing to view FIG. 1, but also considering the view of FIG. 2 where the rail wheels 24 are in an upper, road position and the rail wheels 28 and 30 are in a road position (i.e., they are offset vertically from the road surface 32), it will be appreciated that vehicle 10 may travel on highways or other roads surface such as surface 32. A front road wheel 34 is in a road position in which it contacts surface 32 in FIG. 2, whereas road wheel 34 is in a rail position (i.e., vertically offset from and not contacting any surfaces therebelow) in FIG. 1. Note that, in the preferred embodiment illustrated, the road wheel 34 (as well as a similar wheel on the right side of the vehicle) is not moved up or down relative to frame 12 to change from its rail position to its road position. Instead, it is in a road position when the tire of wheel 34 contacts a surface such as 34 below it due to the lifting of rail wheels 24 relative to frame 12. In similar fashion, wheel 34 is in a rail position offset from below surfaces when the rail wheels 24 have been lowered to their rail position of FIG. 1.

When in their road positions of FIG. 2, the rail wheels 28 and 30 have not been moved relative to the frame 12 from their rail positions of FIG. 1. Instead, the change in the positions of wheels 28 and 30 is relative to surfaces such as 32 which are below the vehicle, this change being accomplished by lowering back and middle road wheels 36 and 38 from rail positions (FIG. 1) to road positions (FIG. 2) relative to frame 12. In FIG. 1, the road wheels 36 and 38 are lifted relative to the surfaces below vehicle 10 until the rail wheels 28 and 30 engage rail 26. Note that in FIG. 1, the wheels 36 and 38 (more specifically the tires of these wheels) are not in contact with the surfaces therebelow, but are elevated from any such surfaces.

Accordingly, the preferred embodiment vehicle 10 of the present invention provides vertical movement of front rail wheels 24, middle road wheels 38, and back road wheels 36 for changing from a rail mode (FIG. 1) for traveling along rails to a road mode (FIG. 2) for traveling on roads. (Wheels 28, 30, and 34 are vertically stationary, meaning not vertically movable relative to frame 12, in the preferred embodiment.) In the rail mode, wheels 24, 28, and 30 are in rail positions contacting below surfaces (i.e., rails) and wheels 34, 36, and 38 are in rail positions elevated from any below surfaces. In the road mode, wheels 24, 28, and 30 are in road positions elevated from any below surfaces and wheels 34, 36, and 38 are in road positions contacting surfaces therebelow.

The vertical movement of wheels 36 and 38 may be accomplished using known tag axles (not shown) which use air to raise and lower the axles on which wheels 36 and 38 are mounted. Alternately, tag axles of known design using springs to raise the axles and air to lower the axles may be used.

The propulsion arrangement of vehicle 10 will be discussed with reference to FIG. 3 and continuing to consider FIGS. 1 and 2. A known type of transfer case 40 with gear train therein is used to select which wheels are driving wheels (i.e., used for propulsion) in a given mode. Specifically, transfer case 40 supplies traction power from engine 42 via normal truck transmission 44 to front road wheels 34 when in the road mode of FIG. 2. However, when rail mode is selected on a selector 46 (which together with transfer case 40 may be considered as a mode controller), the transfer case 40 no longer supplies power to front road wheels 34. Instead, the transfer case 40 now supplies power to a secondary transmission 48. The secondary transmission 48, which is not powered when the selector 46 is in a road mode, is preferably a reversing transmission with a control 50 operable in known fashion to switch from forward, reverse, and neutral positions. Therefore, the maximum reverse and forward speeds via transmission 48 will be the same. In the rail mode, transmission 48 powers the back rail wheels 28 and middle rail wheels 30 by way of tandem truck axles 52 (one middle rail axle and one back rail axle). The axles 52 are called rail axles in that they have rail wheels 28 and 30 thereon, but they may be of known design for tandem truck axles such as double reduction thru-drive tandem axles. One can alternately modify such known truck tandem axles slightly by narrowing the tread width to correspond to rail wheels 28 and 30.

Figure 3:
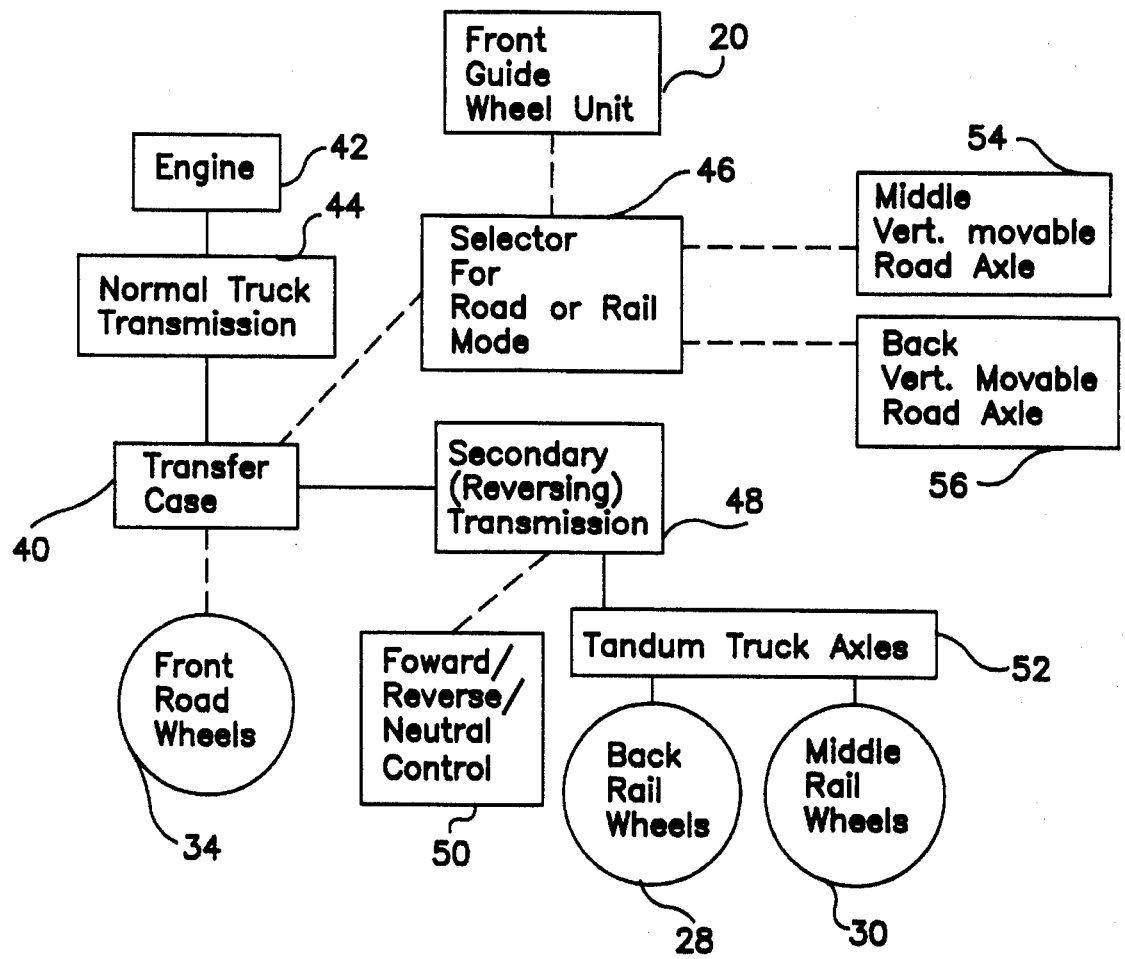
FIG. 3 is a simplified block diagram showing various components of the invention.

Significantly, and as will be apparent from FIG. 3, the road wheels 34 propel the vehicle in the road mode independent of all of the rail wheels. That is, and unlike some prior designs, power to road driving wheels 34 is not supplied via any of the rail wheels. This allows vehicle 10 to travel at reasonable highway speeds and not be limited to the low speeds associated with vehicles where road wheels are driven via rail wheels.

The selector 46 may be of known type of control for a transfer case and may advantageously and in straightforward fashion incorporate controls for raising and lowering the front guide wheel unit 20 corresponding respectively to road mode and rail mode. Further, selector 46 may incorporate controls for raising and lowering a middle road axle 54 and a back road axle 56 corresponding respectively to rail mode and road mode. Such air, air/spring, hydraulic, or other known lifting/lowering mechanisms may also be used for the actual lifting and lowering of rail guide wheel unit 20. Thus, although not shown in FIG. 3 for ease of illustration, a lift/lower mechanism is operable connected between selector 46 and each of components 20, 54, and 56.

Advantageously, the driving wheels (driving rail wheels 28 and 30 and driving road wheels 34) are not moved relative to frame 12, whereas the other wheels (which are non-powered) are moved up and down relative to frame 12. Also, use of rear wheel drive in rail mode, via rail wheels 28 and 30, allows for better loading when rail car coupler 58 has a load of one or more freight or other rail cars coupled to it for pulling by vehicle 10. (The rail car coupler 58 may be powered vertically in order to transfer the load from the rail cars to the vehicle 10 as this will help obtain sufficient tractive effort for pulling/pushing heavy loads on a railroad tracks.) Use of front wheel drive in the road mode minimizes or avoids difficulties and complexities one might otherwise encounter if trying to power the vehicle from the same end (front or back) in both road mode and rail mode.

Note that the wheels 36 and 38 may have two wheels 36 and two wheels 38 (not visible in FIGS. 2 and 3) on each side of the vehicle 10 in known fashion.

Although specific constructions have been presented herein, it is to be understood that these are for illustrative purposes only. Various modifications and adaptations will be apparent to those of skill in the art. In view of possible modifications, it will be appreciated that the scope of the present invention should be determined by reference to the claims appended hereto.

What is claimed is:

1. A road and rail vehicle comprising:

a vehicle frame;

at least a first right front road wheel selectively supporting a portion of the vehicle frame;

at least a first left front road wheel selectively supporting a portion of the vehicle frame;

at least a first right front rail engagement wheel selectively supporting a portion of the vehicle frame;

at least a first left front rail engagement wheel selectively supporting a portion of the vehicle frame;

at least a first right back road wheel selectively supporting a portion of the vehicle frame;

at least a first left back road wheel selectively supporting a portion of the vehicle frame;

at least a first right back rail engagement wheel selectively supporting a portion of the vehicle frame;

at least a first left back rail engagement wheel selectively supporting a portion of the vehicle frame; and a mode controller operable to select between:

a road mode in which the road wheels engage a road and the vehicle is driven by driving road wheels of the road wheels independent of the rail wheels; and a rail mode in which the rail engagement wheels engage rails of a railroad track, the vehicle is driven by driving rail engagement wheels of the rail engagement wheels, and all of the road wheels are offset from any surfaces therebelow; and wherein at least some of the rail engagement wheels are flanged rail engagement wheels and wherein, in the rail mode, the vehicle is driven by driving at least some flanged rail engagement wheels; and further comprising a rail wheel unit operatively connected to the mode controller for movably supporting the right and left front rail engagement wheels for movement relative to the vehicle frame between an upper road position corresponding to the road mode and a lower rail position corresponding to a rail mode and further comprising a back road axle having the right and left back road wheels thereon and wherein the back road axle is operatively connected to the mode controller and to the vehicle frame for moving the back road wheels relative to the vehicle frame between an upper rail position and a lower road position; and wherein operation of the mode controller does not move the driving road wheels and does not move the driving rail engagement wheels.

2. The road and rail vehicle of claim 1 wherein the vehicle frame is the frame of a road vehicle, and wherein the rail engagement wheels are steel rail engagement wheels and wherein, in the rail mode, the vehicle is driven by driving steel rail engagement wheels.

3. The road and rail vehicle of claim 1 wherein the driving rail engagement wheels include the right and left back rail engagement wheels.

4. The road and rail vehicle of claim 3 further comprising right and left middle rail engagement wheels and wherein the driving rail engagement wheels further include the right and left middle rail engagement wheels.

5. The road and rail vehicle of claim 4 wherein the right and left back rail engagement wheels are flanged wheels and the right and left middle rail engagement wheels are non-flanged wheels.

6. The road and rail vehicle of claim 1 wherein the driving rail engagement wheels include the right and left back rail engagement wheels and the driving road wheels include the right and left front road wheels.

7. The road and rail vehicle of claim 6 wherein the vehicle frame is a truck tractor frame and further comprising right and left middle rail engagement wheels and right and left middle road wheels, the right and left middle road wheels movably supported by the vehicle frame for movement between an upper rail position and a lower road position; and wherein the driving rail engagement wheels further include the right and left middle rail engagement wheels and wherein the driving road wheels include the right and left front road wheels.

8. The road and rail vehicle of claim 7 further comprising an engine supported by the vehicle frame; and wherein the mode controller includes a transfer case operable to selectively transfer power either:

from the engine to drive the driving road wheels when in the road mode; and from the engine to drive the driving rail engagement wheels when in the rail mode.

9. A road and rail vehicle comprising:

a vehicle frame;

at least a first right front road wheel selectively supporting a portion of the vehicle frame;

at least a first left front road wheel selectively supporting a portion of the vehicle frame;

at least a first right front rail engagement wheel selectively supporting a portion of the vehicle frame;

at least a first left front rail engagement wheel selectively supporting a portion of the vehicle frame;

at least a first right back road wheel selectively supporting a portion of the vehicle frame;

at least a first left back road wheel selectively supporting a portion of the vehicle frame;

at least a first right back rail engagement wheel selectively supporting a portion of the vehicle frame;

at least a first left back rail engagement wheel selectively supporting a portion of the vehicle frame;

an engine supported by the vehicle frame; and a mode controller to select between:
  a road mode in which the road wheels engage a road and the vehicle is driven by driving road wheels of the road wheels; and
  a rail mode in which the rail engagement wheels engage rails of a railroad track, the vehicle is driven by driving rail engagement wheels of the rail engagement wheels, and the road wheels are offset from any surfaces therebelow; and wherein the mode controller includes a transfer case operable to selectively transfer power either:
  from the engine to drive the driving road wheels when in the road mode; and
  from the engine to drive the driving rail engagement wheels when in the rail mode; and wherein the driving road wheels include the right and left front road wheels, and wherein the driving rail engagement wheels include the right and left back rail engagement wheels; and further comprising a rail wheel unit operatively connected to the mode controller for movably supporting the right and left front rail engagement wheels for movement relative to the vehicle frame between an upper road position corresponding to the road mode and a lower rail position corresponding to a rail mode and further comprising a back road axle having the right and left back road wheels thereon and wherein the back road axle is operatively connected to the mode controller and to the vehicle frame for moving the back road wheels relative to the vehicle frame between an upper rail position and a lower road position; and wherein operation of the mode controller does not move the driving road wheels and does not move the driving rail engagement wheels.

10. The road and rail vehicle of claim 9 wherein, in the road mode, the vehicle is driven by driving road wheels of the road wheels independent of the rail wheels.

11. The road and rail vehicle of claim 9 wherein the right and left back road wheels are non-powered, and wherein the right and left front rail engagement wheels are non-powered.

12. The road and rail vehicle of claim 9 wherein the vehicle frame is a truck tractor frame and further comprising right and left middle rail engagement wheels and right and left middle road wheels, the right and left middle road wheels movably supported by the vehicle frame for movement between an upper rail position and a lower road position; and wherein the driving rail engagement wheels further include the right and left middle rail engagement wheels and wherein the driving road wheels include the right and left front road wheels.

13. A road and rail vehicle comprising:

a vehicle frame;

at least a first right front road wheel selectively supporting a portion of the vehicle frame;

at least a first left front road wheel selectively supporting a portion of the vehicle frame;

at least a first right front rail engagement wheel selectively supporting a portion of the vehicle frame;

at least a first left front rail engagement wheel selectively supporting a portion of the vehicle frame;

at least a first right back road wheel selectively supporting a portion of the vehicle frame;

at least a first left back road wheel selectively supporting a portion of the vehicle frame;

at least a first right back rail engagement wheel selectively supporting a portion of the vehicle frame, the first right back rail engagement wheel being a flanged wheel;

at least a first left back rail engagement wheel selectively supporting a portion of the vehicle frame, the first left back rail engagement wheel being a flanged wheel; and a mode controller to select between:
  a road mode in which the road wheels engage a road and the vehicle is driven by at least one of the right and left front road wheels; and
  a rail mode in which the rail engagement wheels engage rails of a railroad track, the vehicle is driven by at least the right and left back rail engagement flanged wheels, and the road wheels are offset from any surfaces therebelow; and further comprising a rail wheel unit operatively connected to the mode controller for movably supporting the right and left front rail engagement wheels for movement relative to the vehicle frame between an upper road position corresponding to the road mode and a lower rail position corresponding to a rail mode and further comprising a back road axle having the right and left back road wheels thereon and wherein the back road axle is operatively connected to the mode controller and to the vehicle frame for moving the back road wheels relative to the vehicle frame between an upper rail position and a lower road position; and wherein operation of the mode controller does not move the driving road wheels and does not move the driving rail engagement wheels.

14. The road and rail vehicle of claim 13 wherein the vehicle frame is a truck tractor frame and further comprising right and left middle rail engagement wheels and right and left middle road wheels, the right and left middle road wheels movably supported by the vehicle frame for movement between an upper rail position and a lower road position; and further comprising right and left middle rail engagement wheels; and wherein, in the rail mode, the vehicle is driven by the right and left middle rail engagement wheels as well as the right and left back rail engagement wheels.

15. The road and rail vehicle of claim 14 wherein the right and left front rail engagement wheels are non-powered and the right and left back road wheels are non-powered.

16. The road and rail vehicle of claim 15 wherein the right and left front road wheels are driven independent of all of the rail wheels.

17. The road and rail vehicle of claim 13 further comprising an engine supported by the vehicle frame; and wherein the mode controller includes a transfer case operable to selectively transfer power either:

from the engine to drive the right and left front road wheels when in the road mode; and from the engine to drive the right and left back rail engagement wheels when in the rail mode.

18. The road and rail vehicle of claim 17 further comprising a first transmission to transfer power from the engine to the transfer case and a second transmission to transfer power from the transfer case to the right and left back rail engagement wheels.

19. The road and rail vehicle of claim 13 wherein the right and left front road wheels are driven independent of all of the rail wheels.

* * * * *